United States Patent

Napolin

[15] 3,662,235

[45] May 9, 1972

[54] CO-AXIAL TUNING CAPACITOR DEVICES

[72] Inventor: Seymour Napolin, Westbury, N.Y.

[73] Assignee: Melsey Corporation, Carle Place, N.Y.

[22] Filed: Dec. 8, 1970

[21] Appl. No.: 96,000

[52] U.S. Cl. ....................317/249 T, 29/25.42

[51] Int. Cl. ....................H01g 5/14

[58] Field of Search ....................317/249 R, 249 T; 29/25.42

[56] References Cited

UNITED STATES PATENTS 3,253,477 5/1966 Hopt....................317/249 T X

*Primary Examiner*—E. A. Goldberg
*Attorney*—Allison C. Collard

[57] ABSTRACT

A tunable capacitor for use in precision frequency tunable circuits having a tunable slug for movement within a dielectric tube with a capacitive outer surface, wherein protrusions such as dimples are distributed on the surface of the slug in order to maintain a constant and evenly distributed air dielectric between the slug and the tube.

6 Claims, 5 Drawing Figures

INVENTOR.
SEYMOUR NAPOLIN
BY [signature]
ATTORNEY

CO-AXIAL TUNING CAPACITOR DEVICES

This invention relates to means and method for producing precision tuning capacitors.

More specifically, this invention relates to an improvement in tunable slug capacitors, wherein the slug within the capacitor maintains a constant air clearance while it is being moved by a tuning element.

Precision tuning elements for electronic circuits generally utilize a tunable capacitor together with an inductor whereby the capacitor includes a tunable slug for varying the capacitive coupling between the surface of the capacitor and the tunable slug, or the capacitive coupling between two capacitive conductive metal sleeves disposed on the external surface of a cylinder.

In certain applications, a precision capacitor is required that can be tunable over a relatively broad frequency range and wherein repeatable results can be obtained with high accuracy. For example, in frequency meters and the like, wherein the displacement or mechanical position of the moving element of a tunable capacitor is coupled to a calibrated dial or indicator, it is extremely important during the serviceable life of the meter that the indicating dial remains in calibration with the true frequency, and that preselected frequencies can be repeated on the calibrated dial with high accuracy whenever desired.

In one type of tunable capacitors, vitreous or quartz tube is utilized having two spaced-apart capacitive bands or sleeves permanently disposed on the external surface of the glass-like tube. Freely disposed within the cylindrical surface of the tube is a metal slug whose position can be adjusted by any well known means, such as by a precision lead screw and the like. The metal slug which is slidably within the vitreous or quartz cylinder, is utilized to vary the capacitive coupling between the two spaced capacitors or sleeves. The tunable slug generally consists of a conducive metal tube or bar whose external surface has been machined to closely approximate the internal cylindrical diameter of the vitreous tube so that a sliding relationship between the slug and the tube is established with a very small clearance. In certain applications, the slug is restricted from rotating within the vitreous tube as its displacement or position is adjusted by a lead screw or the like. As disclosed in U.S. Pat. No. 3,239,729, the tunable slug may include a longidutinal slot which slidably receives and engages a longitudinal keeper within the vitreous tube which prevents the slug from rotating.

The internal diameter of the vitreous tube and the external diameter of the slug are carefully formed so that the clearance between the two elements is maintained at a few 1/10000ths of an inch. The extremely small clearance between the tunable slug and the dielectric tube has been found to improve the repeatability of readings when the elements are used in a precision frequency instrument. Moreover, by preventing the slug from rotating during its adjustment with respect to the elongated tube, it is possible to eliminate still further discrepancies and inaccuracies which occur due to the eccentricity between the tunable slug and the tube.

In spite of the above steps which have been implemented in the design and construction of the tunable elements, disadvantageous tuning inaccuracies still occur, particularly with respect to the repeatability of the tunable elements. After close analysis, it has been found that these inaccuracies have occurred because of the collapse of the air dielectric when the tunable slug physically touches the walls of the quartz tube at certain tunable readings.

Because of the small clearance which is provided between the surface of the tunable slug and the internal walls of the quartz tube, it has heretofore been found difficult, if not impossible, to control an even and repeatable clearance while the slug is being tuned.

The dielectric constant of the glass-like material from which the tube is manufactured is four to eight times the dielectric constant of air or free space. For certain uncontrollable adjustments, the small clearance between the slug and the quartz tube becomes eliminated, when the slug physically contacts the walls of the tube. Thus, when the clearance is eliminated, the total change in capacitance, which is proportionate to the dielectric constant with respect to air and the dielectric constant with respect to the glass-like material, can vary sufficiently to affect the accuracy and repeatability of a measuring instrument employing the tunable elements. Specifically, as the tuning shaft or screw is rotated clockwise, the slug will position itself against one point on the inside wall of the vitreous dielectric. When the direction of the tuning shaft rotation is reversed, the metal plunger breaks contact with the wall and moves to a point on the opposite side. This phenomenon all occurs within 1° of rotation producing a momentary capacity reversal. Thus, if the tuning shaft is being rotated for an increase of capacity, the capacity will first decrease and then increase suddenly beyond the desired point. This common fault in tuning devices is referred to as "roll back." This condition produces two undesirable effects. One is from the common form of backlash usually attributed to loose threads, gears or linkage. A desired frequency appears on two points on the calibrated dial depending on the direction the tuning device was moving to position the frequency. The second effect is more subtle, — a "roll-back" makes it almost impossible to perform fine tuning, and any vibration which causes the slug to find a new resting place will cause a shift in capacity or tuned frequency. It was, therefore, found necessary to provide a means and method of maintaining a relatively constant air dielectric or clearance between the slug and the tube throughout the entire displacement of the slug.

Due to the extremely small clearance, which is on the order of a few 1/10000ths of an inch, it was found impossible to insert spacers or any other objects which would maintain a constant air dielectric or constant clearance between the mating elements The tunable slug is generally constructed from a machinable metal, such as brass or copper plated invar. It was found that by adding certain surface imperfections or embossments to the external cylindrical surface of the slug, that these imperfections would serve as spacers to maintain an evenly distributed air clearance between the slug and the elongated tube. Accordingly, the present invention provides a means and method for dimpling portions of the surface of the slug in order to cause protrusions or projections to rise slightly above the slug surface for contact with the walls of the tube. This dimpling effect was best achieved by lightly striking selected areas of the slug with a sharp instrument, such as the point of a countersink so that the metal which flowed away from the depression was lifted slightly above the cylindrical surface to cause a small and barely perceptible dimpled surface. These riding points or dimples could be numerous and random, but it was found that a straight line of three groups angularly spaced 120° apart around the slug formed a triangulated support that was amply effective so that any additional points resulted in negligible improvement. The total improvement is a function of the accuracy of concentricity of the dielectric. A perfect concentric tube might be improved only five to 10 times. A tube with 0.002 to 0.004 eccentricity can be improved over 100 times. Even with exacting specifications, eccentricity of less than 0.001 throughout the length of the dielectric tube is rare. By arranging the dimples to be placed at all sectors of the slug, it has been found possible to maintain an evenly distributed and constant air dielectric between the slug and the tube so as to significantly reduce tuning inaccuracies and greatly improve the repeatability of results of the tuner when it is used in conjunction with a precision frequency tuning instrument.

It is, therefore, an object according to the present invention to provide an improved tunable capacitor which has a high tunable precision and improved tuning repeatability.

It is another object according to the present invention to provide a tunable slug capacitor having a dimpled slug for maintaining a constant and evenly distributed sliding clearance with respect to a capacitive tube.

It is still a further object according to the present invention to provide an improved tunable slug capacitor which is simple in design, inexpensive to produce and reliable in operation.

Other objects and features of the present invention will become apparent from the following detailed description considered in connection with the accompanying drawing which discloses the embodiments of the invention. It is to be understood, however, that the drawing is designed for the purpose of illustration only and not as a definition of the limits of the invention.

In the drawing, wherein similar reference characters denote similar elements throughout the several views.

Figure 1:
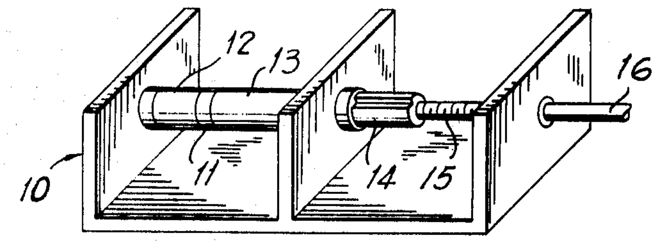
FIG. 1 is a perspective view showing one embodiment of a slotted tunable slug capacitor.

Referring to FIG. 1, there is shown a tunable capacitor mounted in a housing 10. The capacitor may consist in part of an elongated vitreous or quartz tube 11 into which is adjustably inserted a metal slug 14. Screw thread 15 connected on the end of shaft 26 permits accurate adjustment of slug 14 with respect to elongated tube 11. Disposed on the external surface of tube 11 is a tubular conductor or sleeve 12 forming one plate of a capacitor and a second tubular conductor 13 which is spaced apart and insulated from the first conductor.

Figure 2:
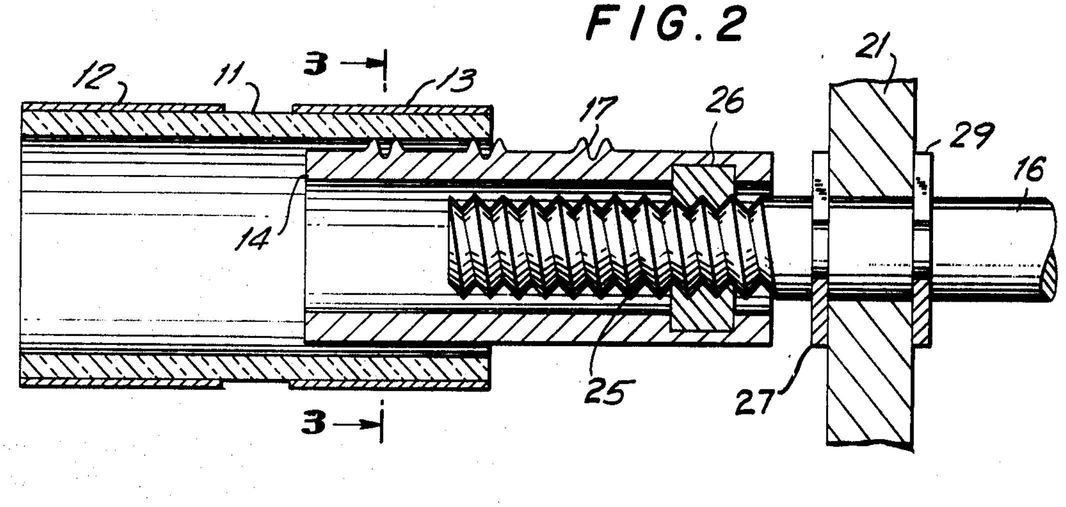
FIG. 2 is a cross-sectional view of another embodiment of a tunable slug capacitor.

A simplified construction of the tunable capacitor is shown in FIG. 2. At one end of quartz tube 11 is secured a support 21 for threadably receiving precision adjustment screw 16 having threads 25 disposed along its length. Screw 16 threadably engages a plug 26 so that slug 14 can be displaced within tube 11 to any desired position. Plug 26 is secured to slug 14 and engages a few threads of screw 16. Screw 16 may include annular grooves on each side of support 21 to receive retaining rings 27 and 29, in order to inhibit any longitudinal movement of screw 16, while permitting the screw to rotate.

Figure 3:
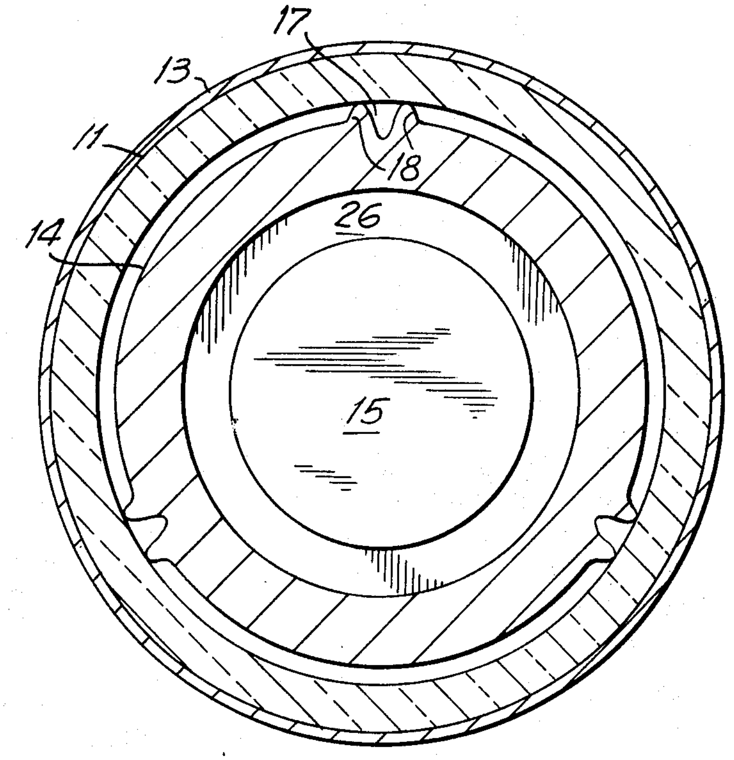
FIG. 3 is a cross-sectional view taken through section 3—3 of FIG. 2.
Figure 4:
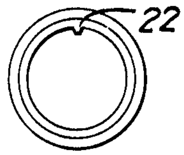
FIG. 4 is a cross-sectional view taken through still another embodiment of the slug according to the invention.
Figure 5:
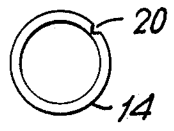
FIG. 5 is a cross-sectional view of the slug of FIG. 4.

The external diameter of slug 14 is constructed to be only a few 1/10000ths of an inch less than the internal diameter of tube 11 so that slug 14 will slide concentrically within tube 11 for any position of adjustment. Tube 11 is preferably constructed from quartz or glass, materials having a low RF loss so that very high efficiency tunable elements can be constructed. Slug 14 is preferably constructed from brass, silver, or copper plated invar, so that its movement within tube 11 causes a change in the capacitive coupling between tubular conductive members 12 and 13. Although slug 14 is designed to slidably fit within tube 11 with almost no clearance, a small clearance is maintained between the surface of slug 14 and tube 11 in order to assure a free sliding relationship between the elements. The small area of clearance between the elements has a different dielectric constant than the solid dielectric. Therefore, if slug 14 contacts internal wall surface of tube 11 so that the clearance has been eliminated, the capacitive coupling between cylindrical elements 12 and 13 will be different than if an air gap separated slug 14 from tube 11. In order to prevent the air clearance from vanishing, a plurality of minute spaced-apart embossments or dimples 17 have been applied to the surface of slug 14 in order to maintain a constant clearance between the slug and tube 11, as shown in exaggerated detail in FIG. 3. Dimples 17 are applied by striking the surface of slug 14 with a sharp pointed instrument so that a depression or cavity is formed at the point of impact. The metal flows around the point of impact to form a minute circular ridge 18 which surrounds the low point of depression 17. The processed slug is then inserted into the solid dielectric tube with a small amount of fine abrasive lapping compound. A few reciprocating strokes polishes and clears the dimples of all direct frictional restraint. Microscopic inside dimensional variations or high spots in the glass are cut away by the dimples, thus producing a near perfect riding surface. Although this process applies to any type of piston capacitor, the procedure is especially effective when using a splined glass mated with a grooved slug as described in U.S. Pat. No. 3,239,729. This construction maintains the lapped points of contact in perfect alignment. These circular ridges, when properly disposed along the longitudinal surface of slug 14 and in all angular quadrants, will effectively maintain the surface of slug 14 a predetermined clearance from tube 11. In FIG. 4, there is shown a cross-sectional view of the preferred embodiment of the capacitor according to the invention, wherein slug 14 includes a longitudinally extending groove or notch 20 which engages a corresponding keeper or sleeve 22 to prevent slug 14 from rotating with respect to tube 11 during the tuning adjustment. FIG. 5 shows a detailed cross-sectional view of the slug including its longitudinally extending groove 20.

Tube 11 may be constructed from any low loss dielectric material, such as glass, ceramic, quartz and the like. The elongated cylindrical aperture within tube 11 is dimensioned close to the final dimension, and then slipped over a steel rod or mandrel. One end of the glass tube is made air tight to the mandrel. A vacuum pump is connected to the other end of the glass tubing. Heat is then applied close to the sealed end of the tube so that as the glass softens, and heat is applied regressively down the length of the tube, the vacuum sucks the softened glass to the surface of the mandrel. After cooling, the glass is removed from the mandrel. This process permits very high contour accuracies on the inside diameter of the tube. Tubular sleeves 12 and 13 may be vacuumed deposited onto the external surface of tube 11 and may consist of silver, copper or any other conductive material. While in the preferred embodiment, tube 11 has been shown with two separated capacitive sleeves, it is within the scope of the invention to construct the capacitor with a single tubular sleeve and employing the slug as the second plate of the capacitor as is well known in the art. Embossments 17, although shown in their preferred embodiment as dimples, could also consist of a circular, spiral or longitudinally extending grooves to form corresponding raised projections on the surface of slug 14.

While only a few embodiments of the present invention have been shown and described, it will be obvious that many changes and modifications may be made thereunto without departing from the spirit and scope of the invention.

What is claimed is:

1 An improved tunable capacitor comprising:
an elongated, hollow cylindrical dielectric tube;
conductive sleeve means disposed on the external surface of said tube;
an elongated cylindrical conductive slug for coaxial slidable insertion within said tube;
a plurality of embossed projections, disposed only on a minor portion of the surface of said cylindrical slug, for slidable engagement with the internal cylindrical surface of said tube, thereby preventing the body of said slug from contacting said dielectric tube; and
tuning means, coupled to said cylindrical slug, for selectively displacing said slug within said tube.

2. The tunable capacitor as recited in claim 1, wherein said plurality of embossed projections comprise circular ridges which project above the cylindrical surface of said slug.

3. The tunable capacitor as recited in claim 1, wherein said embossed projections are disposed in a straight line in groups of three and angularly spaced 120° apart around said slug so as to form a triangulated support for said slug in said tube.

4. The improved tunable capacitor as recited in claim 2, wherein said slug additionally comprises a longitudinally extending groove disposed on its surface, and means insertible in said groove for preventing rotation of the slug during tuning.

5. The improved tunable capacitor as recited in claim 4, wherein said conductive sleeve means comprises;
a first tubular conductor disposed on the external surface of said tube, and
a second tubular conductor spaced apart and adjacent to said first tubular conductor and disposed on said tube.

6. A method for manufacturing a tunable capacitor utilizing a tunable conductive slug within an elongated dielectric tube, comprising the steps of:

dimensioning the slug for close-tolerance, sliding engagement within the dielectric tube;

embossing a minor portion of the conductive surface of said slug with a plurality of projecting members which prevent the main body of said cylindrical slug from contacting said dielectric tube; and inserting said slug within said capacitive tube so that said projections engage the internal walls of said tube and thereby maintain an evenly distributed clearance by preventing lateral movement of said slug.

* * * * *